(12) United States Patent
Wang et al.

(10) Patent No.: US 9,348,145 B2
(45) Date of Patent: May 24, 2016

(54) NAKED-EYE 3D LIQUID CRYSTAL DISPLAY PANEL AND DRIVING METHOD FOR THE SAME

(71) Applicant: Shenzhen China Star Optoelectronics Technology Co., Ltd., Shenzhen, Guangdong (CN)

(72) Inventors: Limin Wang, Guangdong (CN); Ping-sheng Kuo, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 0 days.

(21) Appl. No.: 14/402,100

(22) PCT Filed: Oct. 28, 2014

(86) PCT No.: PCT/CN2014/089710
§ 371 (c)(1),
(2) Date: Nov. 18, 2014

(65) Prior Publication Data
US 2016/0116751 A1  Apr. 28, 2016

(51) Int. Cl.
*G09G 3/36* (2006.01)
*G02B 27/22* (2006.01)
*G02F 1/1343* (2006.01)
*G02F 1/29* (2006.01)

(52) U.S. Cl.
CPC .......... *G02B 27/225* (2013.01); *G02F 1/13439* (2013.01); *G02F 1/134309* (2013.01); *G02F 1/29* (2013.01); *G09G 3/3696* (2013.01); *G09G 2310/0243* (2013.01); *G09G 2310/08* (2013.01)

(58) Field of Classification Search
CPC ..... G09G 3/36; G09G 3/3614; G09G 3/3655; G09G 3/3611; G09G 3/3625
USPC .................................................. 345/87–104
See application file for complete search history.

(56) References Cited

U.S. PATENT DOCUMENTS

| | | | | |
|---|---|---|---|---|
| 2009/0046143 A1* | 2/2009 | Hiddink | ............... | G02B 3/14 348/59 |
| 2010/0097449 A1* | 4/2010 | Jeong | .............. | G02B 27/2214 348/59 |
| 2011/0175884 A1* | 7/2011 | Ono | .................. | G09G 3/3648 345/211 |
| 2014/0063381 A1* | 3/2014 | Zhang | ............ | H04N 13/0409 349/15 |
| 2014/0152925 A1* | 6/2014 | Wu | .................. | G02B 27/2214 349/15 |
| 2014/0160379 A1* | 6/2014 | Wu | .................. | G02B 27/2214 349/15 |
| 2015/0002765 A1* | 1/2015 | Liu | ...................... | G02B 3/12 349/15 |
| 2015/0009434 A1* | 1/2015 | Yang | .............. | G02B 27/2214 349/15 |
| 2015/0091886 A1* | 4/2015 | Quan | .............. | G02B 27/2214 345/212 |

\* cited by examiner

*Primary Examiner* — Alexander Eisen
*Assistant Examiner* — Nelson Lam
(74) *Attorney, Agent, or Firm* — Andrew C. Cheng

(57) ABSTRACT

A naked-eye 3D liquid crystal display panel and a driving method for the same are provided. The naked-eye 3D liquid crystal display panel includes a first substrate, a second substrate disposed oppositely, and a liquid crystal layer. A side of the first substrate adjacent to the liquid crystal layer provides with a driving electrode layer. A side of the second substrate adjacent to the liquid crystal layer provides with a common electrode layer. The driving electrode layer and the common electrode layer respectively receive an AC voltage driving signal, which are the same in frequency and opposite in polarity such that the liquid crystal layer is tilted to form a 3D display. Accordingly, the voltage output requirement of the driving circuit of the 3D liquid crystal display panel 10 when displaying 3D is reduced such that the driving stability and load capacity of the driving circuit is improved.

4 Claims, 3 Drawing Sheets

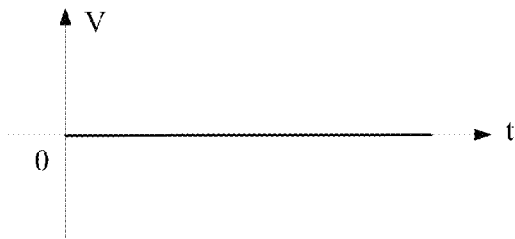

FIG. 5

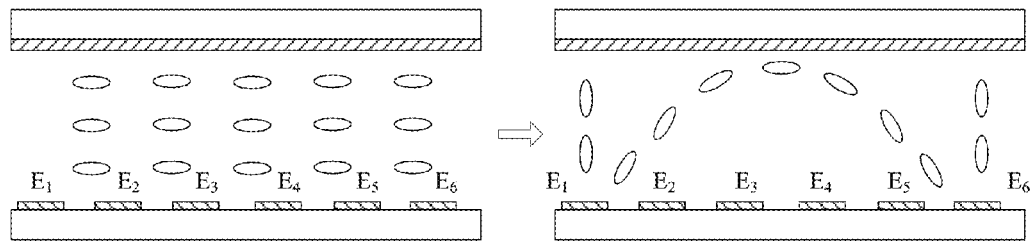

FIG. 6

```
                                                    ─ S71
┌─────────────────────────────────────────────────────┐
│ respectively applying an alternating current(AC) voltage driving │
│ signal to a driving electrode layer and a common electrode layer,│
│   wherein, the driving signals are the same in frequency and are │
│                      opposite in polarity                        │
└─────────────────────────────────────────────────────┘
                              │
                              ▼                       ─ S72
┌─────────────────────────────────────────────────────┐
│ controlling the liquid crystal layer to tilt and forming a 3D display │
└─────────────────────────────────────────────────────┘
```

FIG. 7

NAKED-EYE 3D LIQUID CRYSTAL DISPLAY PANEL AND DRIVING METHOD FOR THE SAME

BACKGROUND OF THE INVENTION

1. Field of the Invention

The present invention relates to a 3D display technology, and more particular to a naked-eye 3D liquid crystal display panel and a driving method for the same.

2. Description of Related Art

To satisfy the public's visual requirement, a 3D display technology has gradually become a necessary part of the display panel display, especially a naked-eye 3D display technology. The naked-eye 3D display technology also represents the development trend of the display panel. The current major naked-eye 3D display technology is realized by controlling the voltage driving signal applied to the driving electrodes of the liquid crystal prism. Specifically, a direct current (DC) voltage driving signal is applied on a common electrode of a substrate of the liquid crystal prism. And the DC voltage driving signal functions as a reference voltage driving signal. At the same time, an alternating current (AC) voltage driving signal is applied on the driving electrodes on the other substrate in order to control the AC voltage (the driving signal) so as to realize the 3D display.

However, in the prior art, the naked-eye 3D display technology uses the DC driving signal as the reference voltage driving signal. If a required liquid crystal pre-tilting angle is achieved for the naked-eye 3D display, a larger AC voltage is required to generate the AC driving signal with a larger voltage amplitude. However, the larger voltage amplitude will increase an output voltage requirement of the driving circuit, and also easily to affect the stability and load capacity of the driving power source of the driving circuit.

SUMMARY OF THE INVENTION

Accordingly, the technology problems solved by the embodiment of the present invention is to provide a naked-eye 3D display liquid crystal panel and a driving method for the same such that the voltage output requirement of the driving circuit of the 3D liquid crystal display panel 10 when displaying 3D is reduced so that the driving stability and load capacity of the driving circuit is improved.

In order to solve the above technology problems, a technology solution adopted by the present invention is to provide: a naked-eye 3D (three dimensional) liquid crystal display panel, comprising: a first substrate; a second substrate disposed oppositely to the first substrate; and a liquid crystal layer disposed between the first substrate and the second substrate; wherein, a side of the first substrate adjacent to the liquid crystal layer is disposed with a driving electrode layer; a side of the second substrate adjacent to the liquid crystal layer is disposed with a common electrode layer; the driving electrode layer and the common electrode layer respectively receive an alternating current (AC) voltage driving signal; the driving signals are the same in frequency and are opposite in polarity such that the liquid crystal layer is tilted to form a 3D display; and wherein, the common electrode layer is a planar electrode covering an entire surface of the second substrate; the driving electrode layer has strip electrodes spaced at intervals; the driving electrode layer and the common electrode layer are connected to a same driving power source.

In order to solve the above technology problems, another technology solution adopted by the present invention is to provide: a naked-eye 3D (three dimensional) liquid crystal display panel, comprising: a first substrate; a second substrate disposed oppositely to the first substrate; and a liquid crystal layer disposed between the first substrate and the second substrate; wherein, a side of the first substrate adjacent to the liquid crystal layer is disposed with a driving electrode layer; a side of the second substrate adjacent to the liquid crystal layer is disposed with a common electrode layer; the driving electrode layer and the common electrode layer respectively receive an alternating current (AC) driving signal; the driving signals are the same in frequency and are opposite in polarity such that the liquid crystal layer is tilted to form a 3D display.

Wherein, the common electrode layer is a planar electrode covering an entire surface of the second substrate; the driving electrode layer has strip electrodes spaced at intervals; the driving electrode layer and the common electrode layer are connected to a same driving power source.

Wherein, the AC voltage driving signal received by the common electrode layer is a reference voltage driving signal; the AC voltage driving signal received by the common electrode layer corresponds to a first group of voltage amplitudes; the AC voltage driving signal received by the driving electrode layer corresponds to a second group of voltage amplitudes; each of a maximum voltage amplitude of the first group of voltage amplitudes and a maximum voltage amplitude of the second group of voltage amplitudes is equal to a half of a maximum voltage amplitude of a third group of voltage amplitudes; the third group of voltage amplitudes is a voltage amplitude corresponding to the AC voltage driving signal received by the driving electrode layer when the liquid crystal layer is titled to form the 3D display and the common electrode layer receives a direct current (DC) voltage driving signal.

Wherein, the naked-eye 3D liquid crystal display panel comprises a display screen and a 3D prism plate disposed at a light emitting direction of the display screen and disposed adjacent to the display screen.

In order to solve the above technology problems, another technology solution adopted by the present invention is to provide: a driving method for a naked-eye 3D (three dimensional) display panel, wherein, the naked-eye 3D (three dimensional) display panel includes a first substrate, a second substrate disposed oppositely to the first substrate, and a liquid crystal layer disposed between the first substrate and the second substrate; a side of the first substrate adjacent to the liquid crystal layer is disposed with a driving electrode layer; a side of the second substrate adjacent to the liquid crystal layer is disposed with a common electrode layer; wherein, the driving method comprises: respectively applying an alternating current (AC) voltage driving signal to a driving electrode layer and a common electrode layer, wherein, the driving signals are the same in frequency and are opposite in polarity; and controlling the liquid crystal layer to tilt and forming a 3D display.

Wherein, the step of respectively applying an alternating current (AC) voltage driving signal to a driving electrode layer and a common electrode layer, wherein, the driving signals are the same in frequency and are opposite in polarity comprises: setting the voltage driving signal received by the common electrode layer as a reference voltage driving signal; and setting the AC voltage driving signal received by the common electrode layer corresponding to a first group of voltage amplitudes; the AC voltage driving signal received by the driving electrode layer corresponding to a second group of voltage amplitudes; wherein, each of a maximum voltage amplitude of the first group of voltage amplitudes and a maximum voltage amplitude of the second group of voltage amplitudes is equal to a half of a maximum voltage amplitude of a third group of voltage amplitudes; the third group of voltage amplitudes is a voltage amplitude corresponding to the AC voltage driving signal received by the driving electrode layer when the liquid crystal layer is titled to form the 3D display and the common electrode layer receives a direct current (DC) voltage driving signal.

The beneficial effect of the embodiments of the present invention is: through respectively applying an AC voltage driving signal to a driving electrode layer on the first substrate and a common electrode layer on the second substrate, and the AC voltage driving signals are the same in frequency and opposite in polarity. A 3D display of the naked-eye 3D liquid crystal display panel is realized. Comparing to the prior art, the embodiment of the present invention does not use a direct current (DC) voltage driving signal as a reference voltage driving signal. On the contrary, in the embodiment of the present invention, the driving electrode layer or the common electrode layer receives an AC voltage driving signal as a reference voltage driving signal. Because the AC voltage driving signals are opposite in polarity, to realize the liquid crystal titling angle for the 3D display, only applying the AC voltage driving signal that is a half of the AC voltage of the prior art can generate the same effect. As a result, the voltage output requirement of the driving circuit of the 3D liquid crystal display panel 10 when displaying 3D is reduced such that the driving stability and load capacity of the driving circuit is improved.

BRIEF DESCRIPTION OF THE DRAWINGS

FIG. 5 is a schematic diagram of a DC voltage driving signal received by a common electrode in the prior art;

FIG. 6 is a schematic diagram of a required liquid crystal tilting angle for the 3F display in the prior art; and FIG. 7 is a flowchart of a driving method for the naked-eye 3D liquid crystal panel according to an embodiment of the present invention.

DETAILED DESCRIPTION OF THE PREFERRED EMBODIMENT

The following content combines with the drawings and the embodiment for describing the present invention in detail. It is obvious that the following embodiments are only some embodiments of the present invention. For a person skilled in the art without creative effort, the other embodiments obtained thereby are still covered by the present invention.

Figure 1:
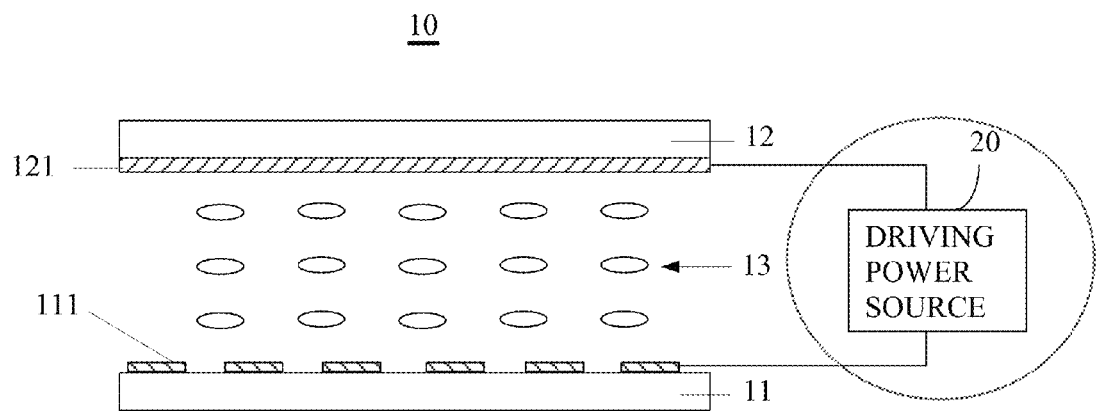
FIG. 1 is a cross-sectional view of a naked eye 3D liquid crystal panel according to a preferred embodiment of the present invention.

FIG. 1 is a cross-sectional view of a naked-eye 3D (three-dimensional) liquid crystal panel according to a preferred embodiment of the present invention. As shown in FIG. 1, the naked-eye 3D liquid crystal panel 10 includes a first substrate 11, a second substrate 12, and a liquid crystal layer 13. Wherein, the first substrate 11 and the second substrate 12 are disposed oppositely with an interval. The second substrate 12 is a color filter (CF) substrate. The first substrate 11 is a thin-film-transistor (TFT) array substrate. The first substrate 11 includes a transparent substrate body and various wirings and pixel electrodes disposed on the transparent substrate body.

Furthermore, a side of the first substrate 11 adjacent to the liquid crystal layer 13 is provided with a driving electrode layer 111. A side of the second substrate 12 adjacent the liquid crystal layer 13 is provided with a common electrode layer 121. The driving electrode layer 111 and the common electrode layer 121 respectively receive an alternating current (AC) voltage driving signal. The alternating current (AC) voltage driving signals are same in frequency and opposite in polarity such that the liquid crystal layer 13 disposed between the first substrate 11 and the second substrate 12 is titled to form a 3D display. It should be noted that the liquid crystal layer 13 is titled, which actually means the liquid crystal molecules of the liquid crystal layer 13 are titled.

In the present embodiment, the common electrode layer 121 is preferably a planar electrode covering an entire surface of the second substrate 12. The driving electrode layer 111 has strip electrodes spaced at intervals.

The naked-eye 3D liquid crystal panel 10 includes a display screen and a naked-eye 3D liquid crystal prism or a naked-eye 3D liquid crystal prism plate disposed at a light emitting direction of the display screen and is adjacent to the display screen. In the present embodiment, the common electrode layer 121 is a planar electrode covering an entire surface of the second substrate 12. When performing the 3D display, the AC voltage driving signal received by the common electrode layer 121 functions as a reference voltage driving signal. The AC voltage driving signals received by the driving electrode layer 111 and the common electrode layer 121 are the same in frequency and opposite in polarity. That is, the AC voltage driving signal received by the common electrode layer 121 correspondingly has a first group of voltage amplitudes $V_1$. The AC voltage driving signal received by the driving electrode layer 111 correspondingly has a second group of voltage amplitudes $V_2$. The voltage difference of the AC voltage driving signal received by the driving electrode layer 111 and the AC voltage driving signal driving signal received by the common electrode layer 121 is a sum of the first group of voltage amplitudes $V_1$ and the second group of voltage amplitudes $V_2$, that is, $V_1+V_2$.

Figure 2:
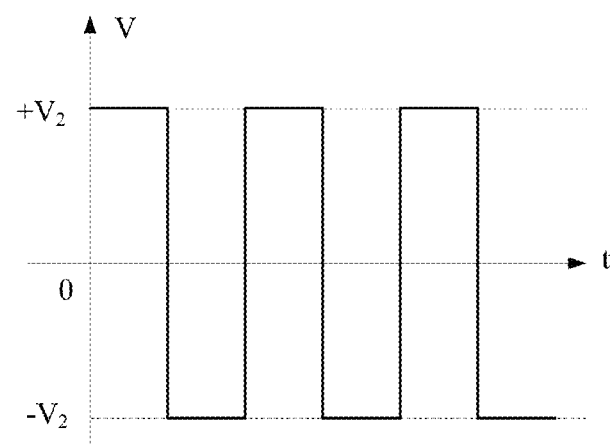
FIG. 2 is a schematic diagram of an AC voltage driving signal received by a driving electrode layer shown in FIG. 1.
Figure 3:
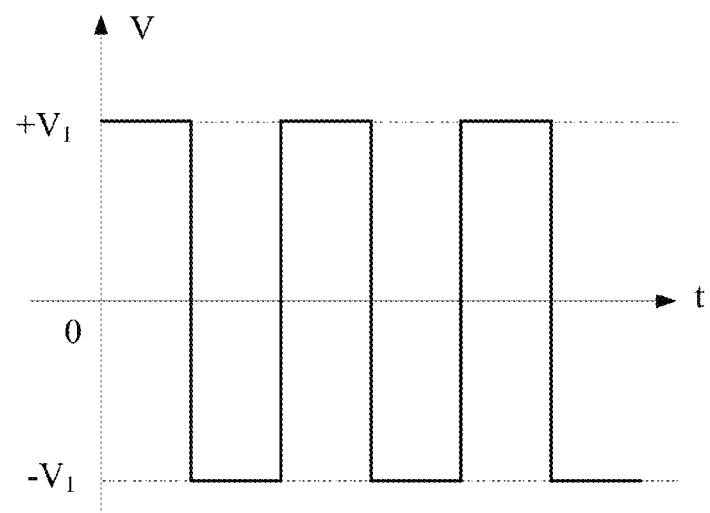
FIG. 3 is a schematic diagram of an AC voltage driving signal received by a common electrode layer shown in FIG. 1.
Figure 4:
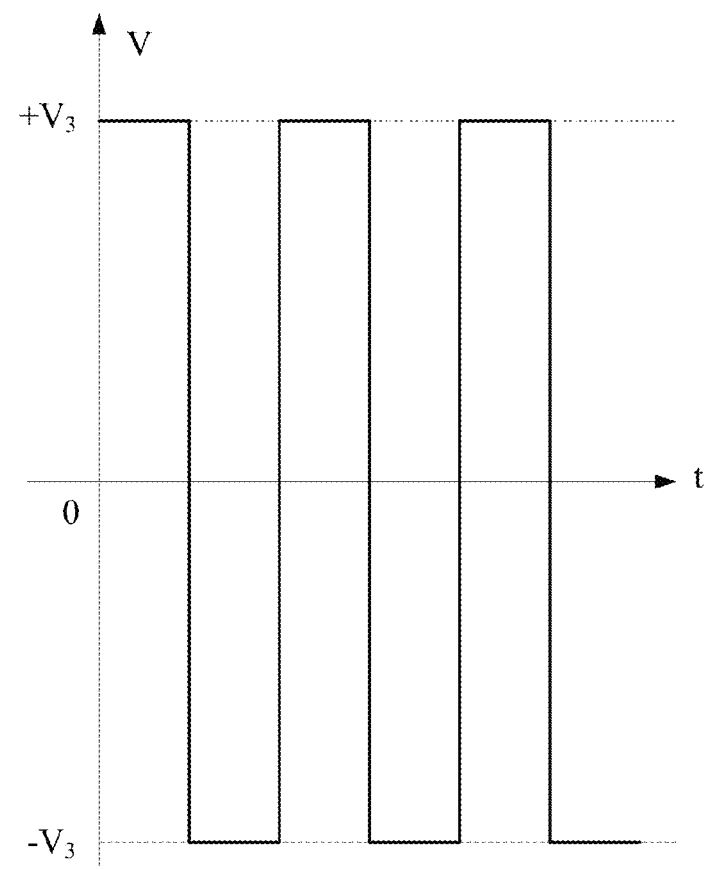
FIG. 4 is a schematic diagram of an AC voltage driving signal received by a driving electrode layer in the prior art.

Please combine the AC voltage driving signal received by the driving electrode layer 111 as shown in FIG. 2 and the AC voltage driving signal received by the common electrode layer 121 shown in FIG. 3. Besides, please also refer an AC voltage driving signal received by a driving electrode layer of the prior art as shown in FIG. 4 and a DC voltage driving signal received by a common electrode layer of the prior art as shown in FIG. 5.

As shown in FIG. 5, the common electrode layer of the prior art receives the DC voltage driving signal as a reference voltage driving signal. A voltage amplitude of the DC voltage driving signal is zero. As shown in FIG. 4, the driving electrode layer of the prior art correspondingly receives a third group of voltage amplitudes $V_3$. The voltage difference of the voltage driving signal of the driving electrode layer and the common electrode layer is the third group of voltage amplitudes $V_3$. The third group of voltage amplitude $V_3$ is a voltage amplitude for tilting the liquid crystal layer in the 3D display in the prior art. Besides, the third group of voltage amplitudes $V_3$ is also a voltage amplitude corresponding to the AC voltage driving signal received by the driving electrode layer when the liquid crystal layer is tilted to form the 3D display in the prior art and the common electrode layer receives the DC voltage driving signal.

Thus, to realize the liquid crystal tilting angle required by the 3D display of the prior art as shown in FIG. 6, at a time moment t, the third group of voltage amplitudes reach $V_3$. Comparing to the prior, in the present invention, to realize the same effect, at the same time moment t, the present invention only requires a sum of the first group of voltage amplitudes $V_1$ corresponding to the time moment t and the second group of voltage amplitudes $V_2$ corresponding to the time moment t to equal to the third group of voltage amplitudes $V_3$, that is, $V_1+V_2=V_3$.

If the first group of voltage amplitudes $V_1$ and the second group of voltage amplitudes $V_2$ which are corresponding to the time moment t are the same, that is, $V_1=V_2$, the same driving effect will be generated by applying a half of the AC voltage of the prior art. At this time, $2*V_1=V_3$ and $2*V_2=V_3$. The voltage output range of the driving circuit for the 3D liquid crystal display panel 10 is $-\frac{1}{2}V_3 \sim +\frac{1}{2}V_3$ or $-V_1 \sim +V_1$ or $-V_2 \sim +V_2$, which is only a half of the voltage output range of the driving circuit of the prior art. As a result, the voltage output requirement of the driving circuit of the 3D liquid crystal display panel 10 when displaying 3D is reduced such that the driving stability and load capacity of the driving circuit is improved.

It should be note that, under normal circumstances, the AC voltage received by the driving electrode layer 111 is not a single AC voltage, but a group of AC voltages that are the same in polarity and different in voltage amplitudes. Therefore, the thing that the first group of voltage amplitudes $V_1$ corresponding to the moment t or the second group of voltage amplitudes $V_2$ corresponding to the moment t is equal to a half of the third group of voltage amplitudes $V_3$ actually means a maximum voltage amplitude of the first group of voltage amplitudes $V_1$ corresponding to the moment t or a maximum voltage amplitude of the second group of voltage amplitudes $V_2$ corresponding to the moment t is equal to a half of a maximum voltage amplitude of the third group of voltage amplitudes $V_3$.

With also reference to FIG. 6, in the 3D display, assume that the voltage differences of areas $E_1 \sim E_6$ of the driving electrode layer 111 and the common electrode layer 121 are respectively 12 v, 10 v, 8 v, 8 v, 10 v, 12 v. In the prior art, the voltages required to be received at areas $E_1 \sim E_6$ of the driving electrode layer 111 are respectively 12 v, 10 v, 8 v, 8 v, 10 v, 12 v. However, in the embodiment of the present invention, the voltages required to be received at areas $E_1 \sim E_6$ of the driving electrode layer 111 are respectively 6 v, 4 v, 2 v, 2 v, 4 v, 6 v. Thus, the voltage output range of the driving circuit of the present invention is $-6$ v$\sim+6$ v, which is only a half of the voltage output range of $-12$ v$\sim+12$ v of the prior art.

In the preferred embodiment of the present invention, driving electrode layer 111 and the common electrode layer 121 are connected to a same driving power source 20 in order to output AC voltages capable of generating the above AC voltage driving signals.

It should be noted that the voltage amplitude of the embodiment of the present invention is an absolute value. For example, $2*V_1=V_3$ represents the absolute value of the first group of voltage amplitudes $V_1$ is a half of the absolute value of the third group of voltage amplitudes $V_3$. For the polarity representation of each voltage driving signal, the positive polarity is represented as "+" and the negative polarity is represented as "−". The voltage amplitude corresponds to the voltage difference among the voltage amplitude of each voltage amplitude represents a sum of each amplitude at the same time moment t or within the same time interval.

Furthermore, according to the disposition position, the strip electrodes of the driving electrode layer 111 covered on the first substrate 11 are transparent. A scanning electrode, an insulation layer, a passivation layer, and pixel electrodes are sequentially disposed on the first substrate (an array substrate) 11. If the driving electrode layer 111 is disposed between the insulation layer and the passivation layer, the materials of the driving electrode layer 111 and the common electrode layer 121 are the same and are indium tin oxide (ITO). Of course, in another embodiment, if the position of the driving electrode layer 111 is corresponding to the scanning electrode and/or a data electrode, the materials of the driving electrode layer 111 and the common electrode layer 121 are not the same, that is, an opaque material such as copper or aluminum.

FIG. 7 is a flowchart of a driving method for the naked-eye 3D liquid crystal panel according to an embodiment of the present invention. As shown in FIG. 7, the driving method of this embodiment comprises:

Step S71: respectively applying an alternating current (AC) voltage driving signal to a driving electrode layer and a common electrode layer, wherein, the driving signals are the same in frequency and are opposite in polarity;

Step S72: controlling the liquid crystal layer to tilt and forming a 3D display.

The driving method of this embodiment is for driving the naked-eye 3D liquid crystal display panel 10 in the above embodiment. Each step of the driving method is executed through the corresponding structure of the naked-eye 3D liquid crystal display panel 10.

In summary, through respectively applying an AC voltage driving signal to a driving electrode layer on the first substrate and a common electrode layer on the second substrate, and the AC voltage driving signals are the same in frequency and opposite in polarity. A 3D display of the naked-eye 3D liquid crystal display panel is realized. Comparing to the prior art, the embodiment of the present invention does not use a direct current (DC) voltage driving signal as a reference voltage driving signal. On the contrary, in the embodiment of the present invention, the driving electrode layer or the common electrode layer receives an AC voltage driving signal as a reference voltage driving signal. Because the AC voltage driving signals are opposite in polarity, to realize the liquid crystal titling angle for the 3D display, only applying the AC voltage driving signal that is a half of the AC voltage of the prior art can generate the same effect. As a result, the voltage output requirement of the driving circuit of the 3D liquid crystal display panel 10 when displaying 3D is reduced such that the driving stability and load capacity of the driving circuit is improved.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A naked-eye 3D (three dimensional) liquid crystal display panel, comprising:
 a first substrate;
 a second substrate disposed oppositely to the first substrate; and
 a liquid crystal layer disposed between the first substrate and the second substrate;
 wherein, a side of the first substrate adjacent to the liquid crystal layer is disposed with a driving electrode layer; a side of the second substrate adjacent to the liquid crystal layer is disposed with a common electrode layer; the driving electrode layer and the common electrode layer respectively receive an alternating current (AC) voltage driving signal; the driving signals are opposite in polarity such that the liquid crystal layer is tilted to form a 3D display;

wherein, the common electrode layer is a planar electrode covering an entire surface of the second substrate; the driving electrode layer has strip electrodes spaced at intervals; the driving electrode layer and the common electrode layer are connected to a same driving power source; and wherein, the AC voltage driving signal received by the common electrode layer is a reference voltage driving signal; the AC voltage driving signal received by the common electrode layer corresponds to a first group of voltage amplitudes; the AC voltage driving signal received by the driving electrode layer corresponds to a second group of voltage amplitudes; each of a maximum voltage amplitude of the first group of voltage amplitudes and a maximum voltage amplitude of the second group of voltage amplitudes is equal to a half of a maximum voltage amplitude of a third group of voltage amplitudes; the third group of voltage amplitudes is a voltage amplitude corresponding to the AC voltage driving signal received by the driving electrode layer when the liquid crystal layer is titled to form the 3D display and the common electrode layer receives a direct current (DC) voltage driving signal.

2. A naked-eye 3D (three dimensional) liquid crystal display panel, comprising:
a first substrate;
a second substrate disposed oppositely to the first substrate; and
a liquid crystal layer disposed between the first substrate and the second substrate;
wherein, a side of the first substrate adjacent to the liquid crystal layer is disposed with a driving electrode layer; a side of the second substrate adjacent to the liquid crystal layer is disposed with a common electrode layer; the driving electrode layer and the common electrode layer respectively receive an alternating current (AC) driving signal; the driving signals are opposite in polarity such that the liquid crystal layer is tilted to form a 3D display;
wherein the common electrode layer is a planar electrode covering an entire surface of the second substrate; the driving electrode layer has strip electrodes spaced at intervals; and
wherein, the AC voltage driving signal received by the common electrode layer is a reference voltage driving signal; the AC voltage driving signal received by the common electrode layer corresponds to a first group of voltage amplitudes; the AC voltage driving signal received by the driving electrode layer corresponds to a second group of voltage amplitudes; each of a maximum voltage amplitude of the first group of voltage amplitudes and a maximum voltage amplitude of the second group of voltage amplitudes is equal to a half of a maximum voltage amplitude of a third group of voltage amplitudes; the third group of voltage amplitudes is a voltage amplitude corresponding to the AC voltage driving signal received by the driving electrode layer when the liquid crystal layer is titled to form the 3D display and the common electrode layer receives a direct current (DC) voltage driving signal.

3. A driving method for a naked-eye 3D (three dimensional) display panel, wherein, the naked-eye 3D (three dimensional) display panel includes a first substrate, a second substrate disposed oppositely to the first substrate, and a liquid crystal layer disposed between the first substrate and the second substrate; a side of the first substrate adjacent to the liquid crystal layer is disposed with a driving electrode layer; a side of the second substrate adjacent to the liquid crystal layer is disposed with a common electrode layer; wherein, the driving method comprises:
respectively applying an alternating current (AC) voltage driving signal to a driving electrode layer and a common electrode layer, wherein, the driving signals are opposite in polarity; and
controlling the liquid crystal layer to tilt and forming a 3D display;
wherein, the common electrode layer is a planar electrode with an entire structure; the driving electrode layer has strip electrodes spaced at intervals; and
wherein the step of respectively applying an alternating current (AC) voltage driving signal to a driving electrode layer and a common electrode layer, wherein, the driving signals are opposite in polarity comprises:
setting the voltage driving signal received by the common electrode layer as a reference voltage driving signal; and
setting the AC voltage driving signal received by the common electrode layer corresponding to a first group of voltage amplitudes; the AC voltage driving signal received by the driving electrode layer corresponding to a second group of voltage amplitudes; wherein each of a maximum voltage amplitude of the first group of voltage amplitudes and a maximum voltage amplitude of the second group of voltage amplitudes is equal to a half of a maximum voltage amplitude of a third group of voltage amplitudes; the third group of voltage amplitudes is a voltage amplitude corresponding to the AC voltage driving signal received by the driving electrode layer when the liquid crystal layer is titled to form the 3D display and the common electrode layer receives a direct current (DC) voltage driving signal.

4. The driving method according to claim 3, wherein, the driving electrode layer and the common electrode layer are connected to a same driving power source.

* * * * *